Dec. 10, 1957  P. M. ANGELL ET AL  2,815,625
CONFECTIONERY CUTTER AND PACKER
Filed Oct. 30, 1952  5 Sheets-Sheet 3

INVENTORS.
Paul M. Angell
Albert B. Mojonnier
By Kegan & Kipnis
Attorneys

Dec. 10, 1957 P. M. ANGELL ET AL 2,815,625
CONFECTIONERY CUTTER AND PACKER
Filed Oct. 30, 1952 5 Sheets-Sheet 4
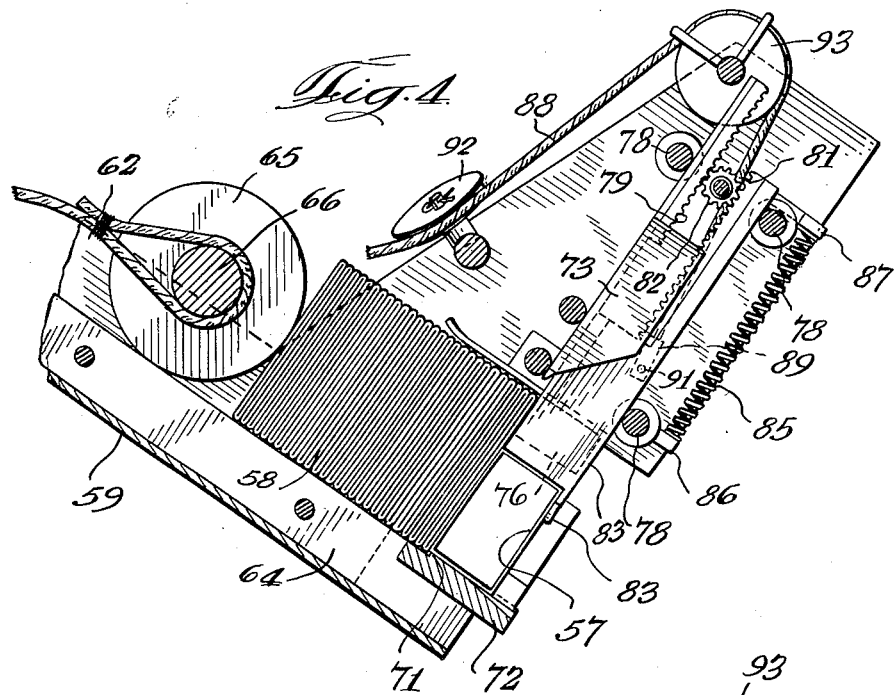
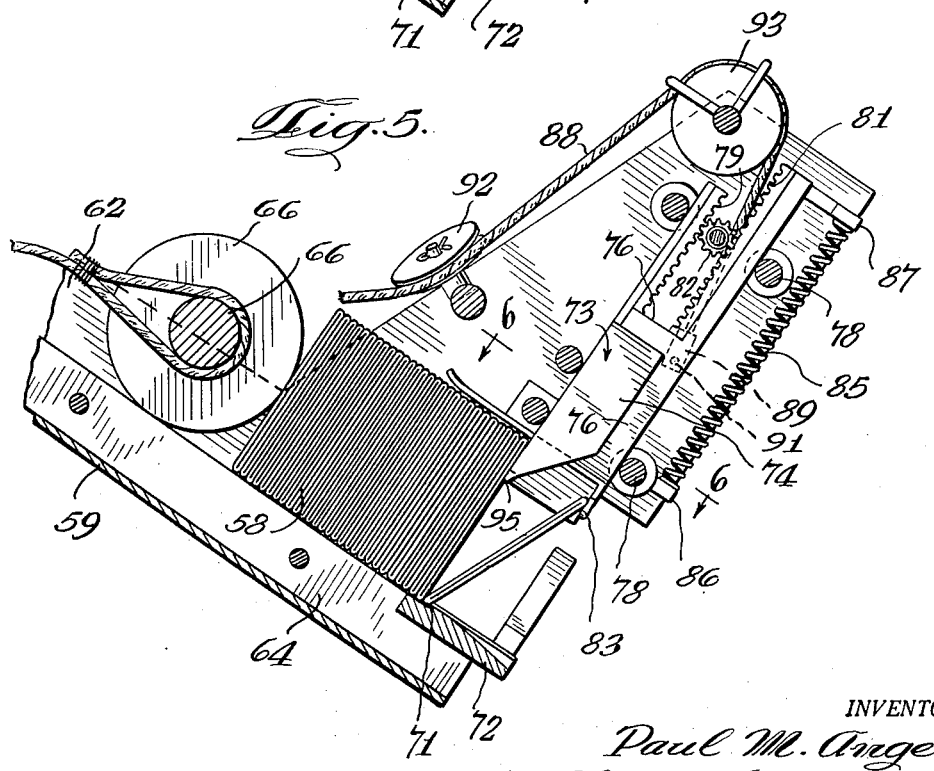
INVENTORS.
Paul M. Angell
Albert B. Mojonnier
By Kegan & Kipnis
Attorneys Dec. 10, 1957 P. M. ANGELL ET AL 2,815,625
CONFECTIONERY CUTTER AND PACKER
Filed Oct. 30, 1952 5 Sheets-Sheet 5

INVENTORS.
Paul M. Angell
Albert B. Mojonnier
By Kegan & Kipnis
Attorneys

United States Patent Office 2,815,625
Patented Dec. 10, 1957

2,815,625

CONFECTIONERY CUTTER AND PACKER

Paul M. Angell, Chicago, and Albert B. Mojonnier, Park Ridge, Ill., assignors to Newly Weds Baking Co., Chicago, Ill., a corporation of Illinois Application October 30, 1952, Serial No. 317,804

7 Claims. (Cl. 53—186)

Our invention relates to lightweight, portable, motor-driven apparatus for continuously, simultaneously cutting and packaging bars of prepared confectionery goods, or similar comestibles.

A principal object of our invention is to provide a machine capable of slicing from a linear or continuous strip blocks or sections of a frozen prepared confection and of inserting such blocks or strips into pre-folded cartons which are automatically opened and erected by the machine to receive the confectionery inserts as rapidly as they are severed from the supply stock.

Another object of the present invention is to achieve a confectionery cutting and packaging machine which will be light in weight and economical to manufacture, thereby to make feasible a plan of merchandising under which the confectionery goods may be shipped in large refrigerated cargos, and at destination stations severed into smaller sections and packaged for consumer distribution.

A further object of our invention is to provide a low-cost portable confectionery cutting and packaging apparatus capable of operating under high speed, production-line standards of performance, while yet being adequately sturdy, reliable, and safe, so as to be manageable by relatively unskilled attendants.

A still further object of our invention is to achieve a confectionery cutting and packaging apparatus in which the two performance functions of cutting and packaging are carried out by characteristically simple and readily accessible operating mechanism, efficiently synchronized so as to require but little attention respecting setting and adjustment, and capable of being powered by a single low-cost operating motor electrically driven at efficient speeds of operation, with but small current consuming loads.

These and other objects of our invention are fully realized in a preferred embodiment of structure which comprises a light-weight supporting framework on which is angularly disposed a reservoir chute adapted to be loaded with a continuous strip of previously prepared frozen confections, such as, for example, a sandwich strip of multiple layers of cake and ice cream. This food commodity is gravitationally advanced to a lowermost cutting level whereat a cyclically operated severing knife is operated with a rapid chopping stroke, capable of effecting a clean perpendicular severance not only to the frozen confection but also to a partially enveloping channel wrapper thereof. A plurality of folded cartons is advanced toward the cutting level from a position sidewardly offset and perpendicular to the confectionery supply chute. The contained cartons are gravitationally advanced to the cutting level and the lowermost carton is forcibly erected in a position horizontally in alignment with the severed block. A loading mechanism, including a plunger, is timed to execute a packaging stroke upon the severing of a confectionery segment directing the segment into the awaiting erected carton. The cartons then are forthwith discharged in readiness for consumer distribution.

In order that our invention may be more fully disclosed, reference is had to the accompanying drawings, which illustrate one form of confectionery cutter and packaging machine embodying the foregoing and such other principal advantages or capabilities as may be pointed out during the course of the following detailed description or such as are inherent in the present invention. For purposes of clarity in exposition, the following description is explicit and the illustrations of the accompanying drawings are detailed, but it is distinctly to be understood that said exposition is for the sake of illustration only and that our invention is not to be restricted in respect to any particular details of the drawings or recitation of the specifications.

In the drawings:

Fig. 4 is a detailed sectional view of the carton supply chute and feeding apparatus and is taken approximately on line 4—4 of Fig. 2;

Fig. 5 is a sectional view similar to Fig. 4 showing a changed position of the mechanism thereof;

In the accompanying drawings and in the following detailed description, similar reference characters designate corresponding parts throughout.

Figure 1:
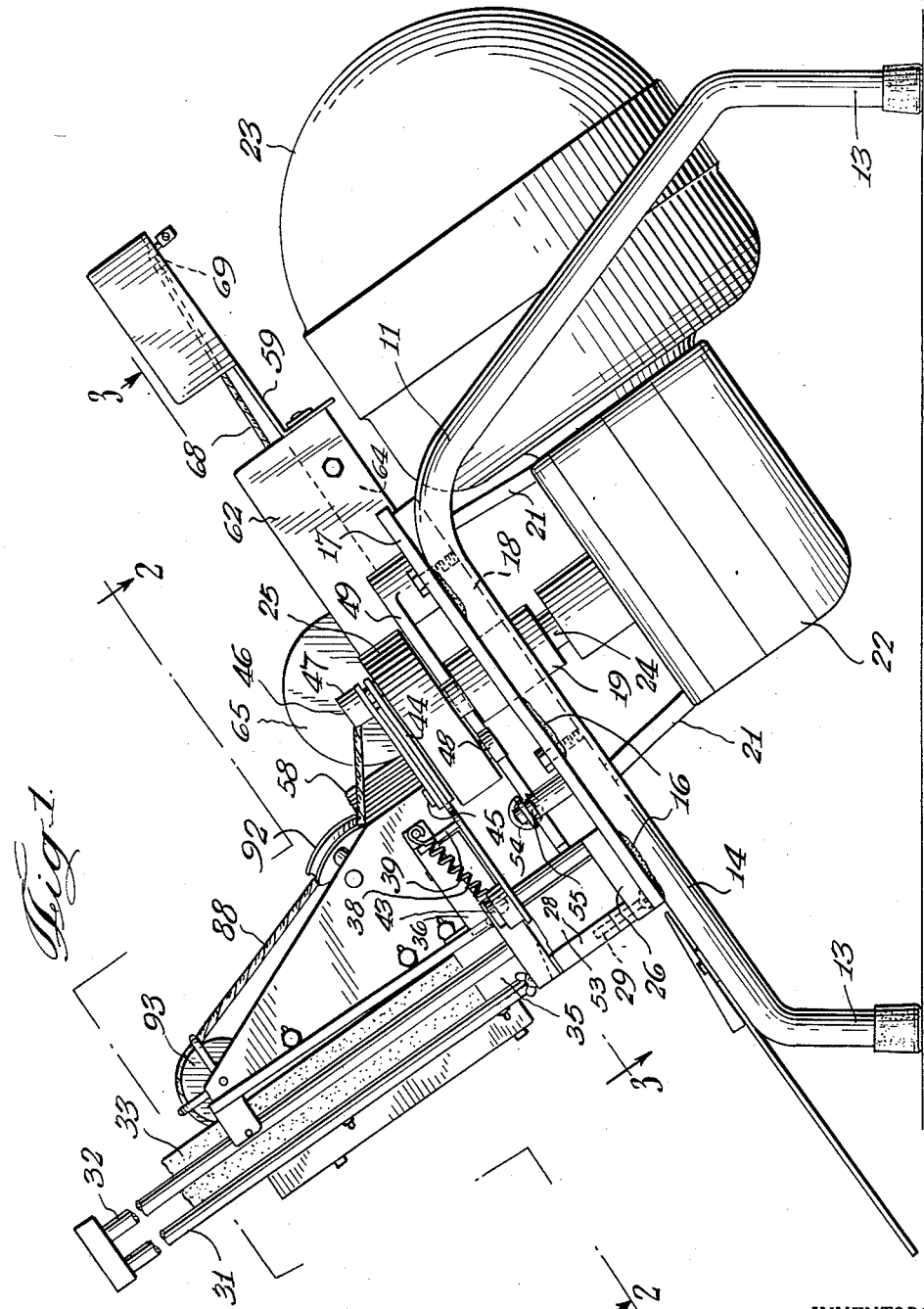
Fig. 1 is a side elevational view of a confectionery cutting and packaging machine in which are embodied certain features and advantages of our invention.

In order to utilize advantageously gravitational forces in the feeding of the commodity to be packaged, a principal support structure means comprising a pair of angularly shaped side frame members 11 and 12 are utilized, having support legs 13 at their extremities for resting on a horizontal surface such as a table or floor and providing the inclined sections 14 and 15 to which may be secured as by welding at 16 a bedplate, indicated 17. To the bedplate 17 there is mounted on the underside a faceplate 18, which carries the motor journal 19 as well as the support arms 21 anchored to the housing of a gear reduction box 22.

Rotary power is introduced into gear reduction box 22 by an electric motor 23 and the reduced motion power shaft 24 which extends from this box obtains adequate journal support from the substantial collar journal 19 to be able to carry at its free end the crank arm flywheel 25.

Figure 7:
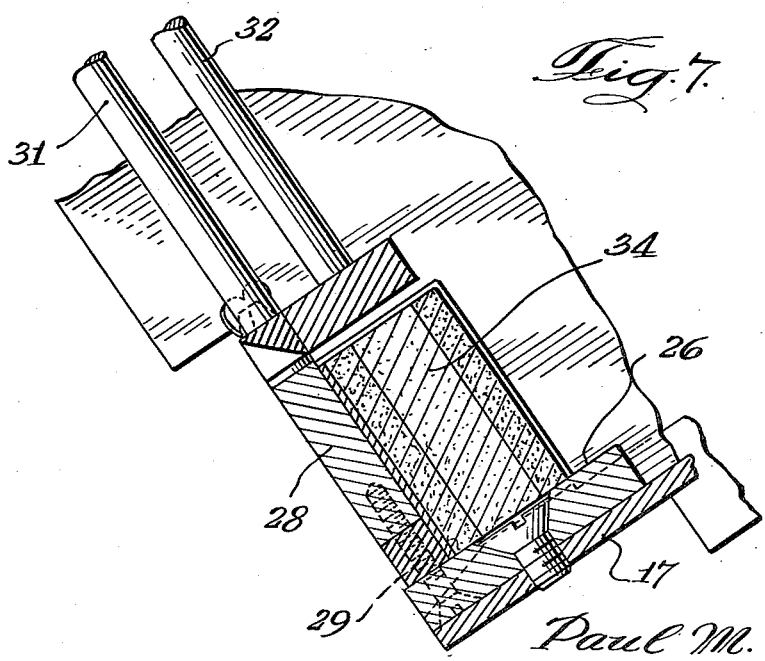
Fig. 7 is an enlarged detailed sectional view taken approximately on line 7—7 of Fig. 2.

The angular disposition of the framework sections 14 and consequently of the bedplate 17 after the manner best indicated in Fig. 1, which is about 40 degrees from the horizontal, determines the relative angular disposition of the slideplate 26, Fig. 7, from which extends perpendicularly upwards a block 28 secured to it by means of the mortised or countersunk screws 29. Block 28 carries the bottom and side guide rails 31 and 32 respectively, which together constitute the chute that carries a stock length of confection 33 from which are sliced or severed the individual blocks 34.

Figure 2:
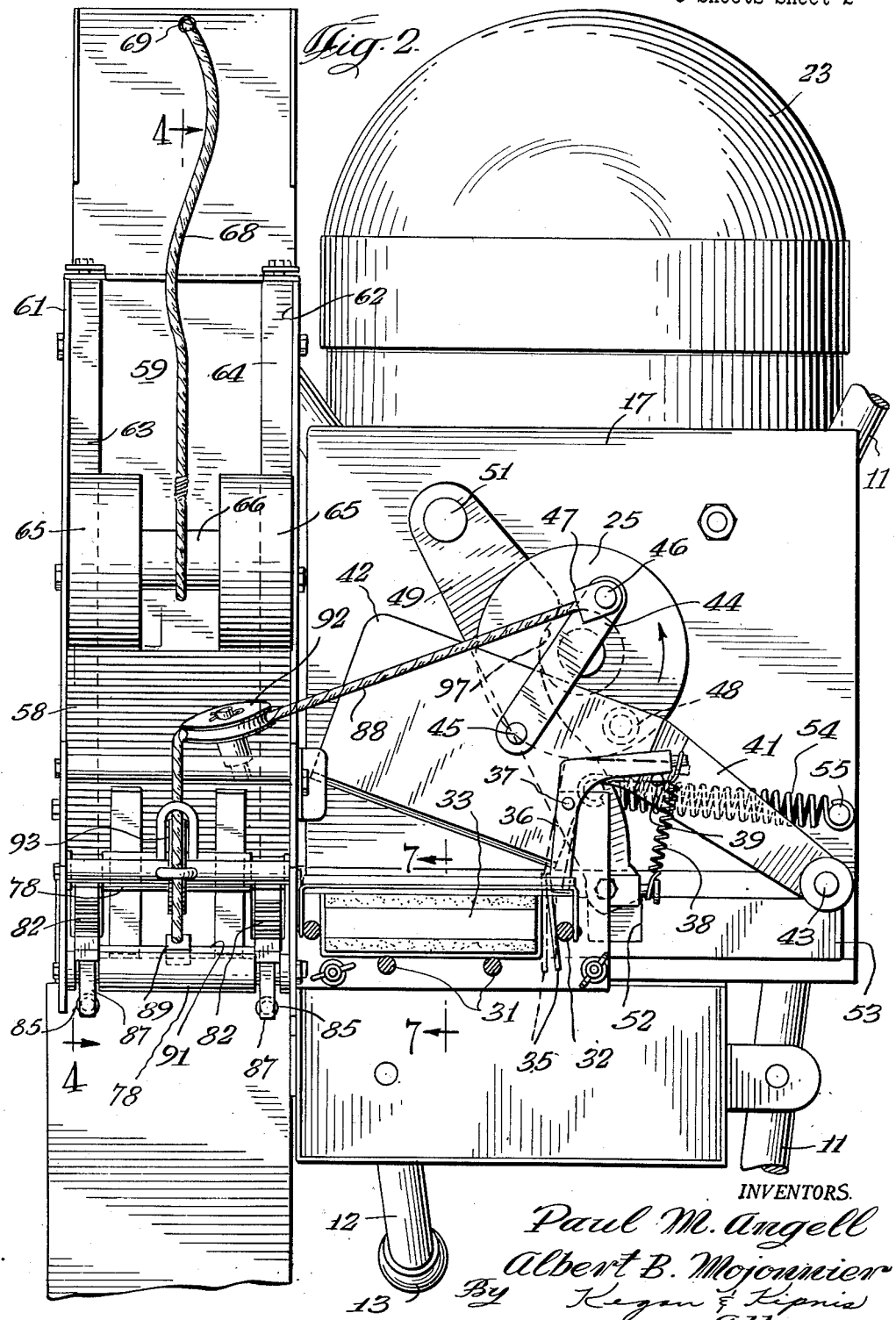
Fig. 2 is an enlarged cross-sectional view taken approximately on the offset line 2—2 indicated on Fig. 1.
Figure 3:
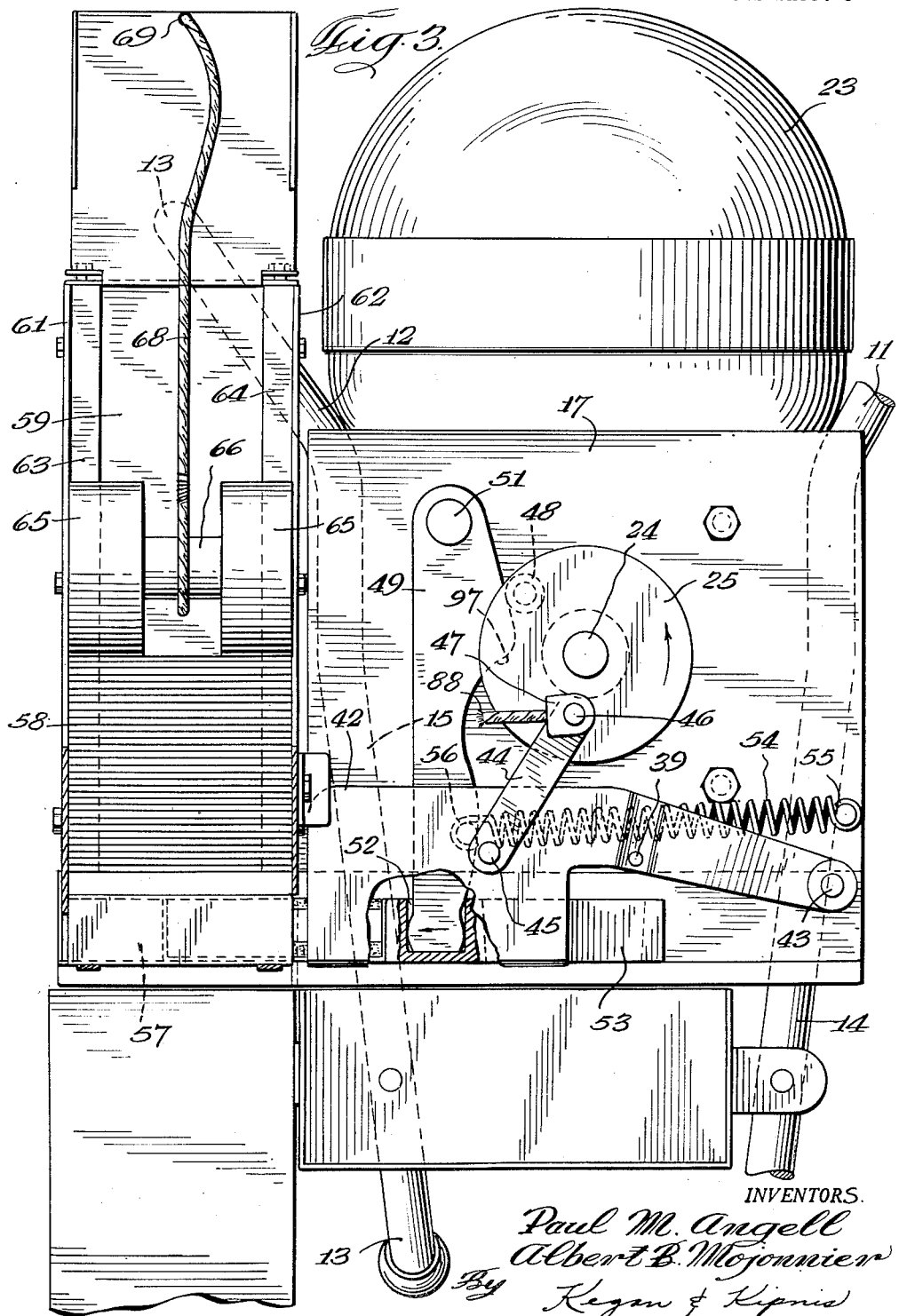
Fig. 3 is another transverse seceional view on an enlarged scale taken approximately on the line 3—3 of Fig. 1.

The supply stock or confectionery strip, being accordingly disposed at an angle of about 50 degrees, tends readily to descend until its lowermost end strikes the slideplate 26 unless it is otherwise retarded as by a pressure plate 35, carried by a bell crank lever 36, which is pivoted at 37, and urged to press against the side of the supply strips by a spring 38 (Figs. 1, 2). The action of spring 38 is restrained during that portion only of each stroke interval when a stud pin 39, which juts sidewardly from the shank portion 41 of a severing blade 42, recedes from that position in which it is shown in Fig. 2 and starts towards its other extremity of position as shown in Fig. 3.

The knife blade is pivoted at 43 (Figs. 1, 2 and its stroke is throughout constrained by reason of its connection through link 44, pivoted at 45 and 46 and actuated by the flywheel 25. At pivot 46, there is also carried the cable anchorage collar 47, which controls the carton feed and erection operations as will be described later. On its rear surface, flywheel 25 also carries a crankpin 48, which engages the adjacent surface of a pivoted lever 49 as the wheel 25 describes cyclic rotations. Lever 49 is pivoted at 51 in the bedplate 17 and its remote end is sufficiently circular to permit it to slide and rotate within a slot 52 of a weighted feed plunger 53 as the reciprocal oscillation of lever 49 causes plunger 53 to move to and fro, stimulated in its feed stroke by the already described crankpin 48. Its return stroke is powered by an expansible coil spring 54 anchored at 55 to a post which extends from the bedplate 17 and articulated at 56 to a similar pin which juts from the side of lever 49.

The feed stroke of plunger 53, which is to the left as observed in Figs. 2 and 3, advances the severed block of confectionery material, correspondingly inserting it fully into the awaiting erected carton 57, which has meanwhile descended to the lowermost position and undergone the feed and erection operations in synchronism with the severing stroke, as will now be described.

A supply of cartons 58, in prefolded condition, is maintained in a channel shaped chute formed of sheet metal and consisting of the bottom wall 59 and the side walls 61 and 62. Rack bars 63, 64, positioned adjacent the interior corners of this chute, allow cartons 58 to have a free sliding action. In addition, bars 63, 64 provide a track on which a weighted follower's side flange wheels 65, 65 roll, while the follower's reduced intermediate neck portion 66 travels between the tracks.

The entire chute assembly is secured as by welding or bolting to the main support framework, laterally of the bedplate 17, so that it assumes the same relative angular position as does bedplate 17. As a consequence it is relatively perpendicular, as viewed in Fig. 1, to the chute rails 31 and 32 which contain the stock strip of confectionery material. The weighted follower 65—66 is prevented from descending below a predetermined level by being tied through a lashing cord 68, one end of which is looped around the reduced intermediate neck portion 66 and the other end of which is knotted through an aperture 69 near the upper end of bottom plate 59, as best indicated in Fig. 1.

Figure 6:
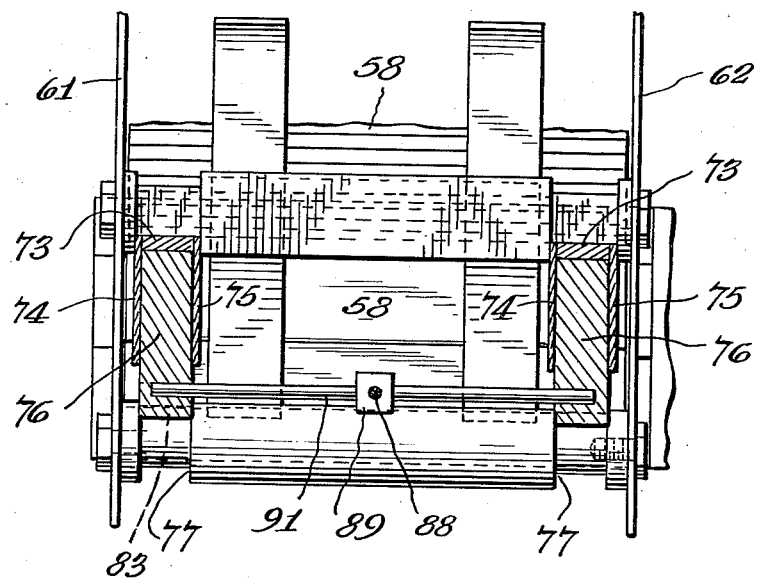
Fig. 6 is a fragmentary sectional view taken approximately on line 6—6 of Fig. 5.

Because of the angular disposition of the chute assembly which contains the folded cartons 58 and its rack members 63 and 64, both the folded envelopes 58 and the follower roller 65—66 tend to maintain their alignment between the side walls 61 and 62 and also to advance progressively resting upon the rails 63 and 64. The lowermost folded carton 58 is detained when its bottom edge reaches a shallow shoulder 71 formed in an anvil bar 72, and because its uppermost end encounters the top surfaces of a pair of rack bar slides comprised of inverted U-shaped channels designated 73, Fig. 6. Depending sidewall portions 74 and 75 on each of the rack bar slides 73 straddle a pair of reciprocable blocks 76, confined to reciprocating parallel motion within the grooves 77 of a pair of guide rollers 78. These blocks 76 as well as their carried channel members 73 are provided at their rear ends with rack bar teeth as at 79 and 81, which mesh with the mating teeth of a pair of intermediate pinions 82, which in themselves function as idlers. The blocks 76, in addition to functioning as path barriers for the oncoming folded cartons as illustrated in Fig. 4, are also provided with lip extremities 83, which become effective when a lowermost carton is permitted to descend into folding position by preventing such carton from descending too far after the manner indicated in Fig. 5.

Block members 76 are spring urged to maintain their foremost or barrier positions such as that indicated in Fig. 4, by reason of the individual expansible coil springs 85, which connect between the stationary or fixed anchor posts 86 and the arms 87 which are carried by the rack bars 81. In opposition to these springs 85, the two rack bar blocks 76 are capable of being withdrawn under the influence of a pulley guided flexible cable 88, which at 89 is connected to a transverse tie-rod 91. Cable 88 is articulated to the flywheel crankpin 46, already described, passing over the directing pulley wheels 92 and 93, so disposed as to present the working end of the cable in proper position to pull upon the tie rod 91 which joins the two block members 76.

From the foregoing, it will be understood that the operation affecting the to and fro movement of block members 76 and consequently also of their companion members 73 is performed in timed relation with the operations of the cutting and packing apparatus, including particularly the cutoff knife 42 and the shuttle block 53 which shuttles the severed confectionery sections into the awaiting open carton when it is disposed in the position indicated in Fig. 4.

By contemplating Figs. 2, 3 and 5, it will be noted that during that portion of the cycle of flywheel 25, when pivot 46 draws up on cable 88 retracting the two blocks 76 and causes counter-clockwise rotation of the pinions 82, as viewed in Figures 4 and 5, the cleaver blade 42 is withdrawn from its effective field of cutting the ice cream brick 33 and also that lever arm 49 is free to respond to its return spring 54. Accordingly, at this time, when the pinions 82 thrust their rack bars 79 forward projecting the beveled extremities 95 of their channel shaped members 73 in position to strip the lowermost folded carton from the accumulated stack of cartons 58, after the manner shown in Fig. 5, the previously severed section of comestible has already been packaged and discharged, the blade 42 has been withdrawn, and stock 33 has been permitted to descend into a position engaging the slide plate 26, Fig. 7, in readiness for another slice to be sectioned off. As the wheel 25 begins to rotate in a counter-clockwise direction, crankpin 48 will be observed to have nearly a full half cycle of revolution to undergo before encountering the edge of lever arm 49 which it operates. Before this, however, cable 88 will have been released and link 44 will have traveled its descending course, actuating knife 42 and cutting off a block or section of the strip 33, a condition slightly in advance of that illustrated in Fig. 3.

As a result of having relaxed cable 88, the rack bar elements 79 and 81 will move from the position shown in Fig. 5 to that shown in Fig. 4. As a consequence, the stack of cartons will move downwardly a distance corresponding to the thickness of a single carton, which carton meanwhile will have been removed and erected by the thrust action of blocks 76. This action first places a longitudinal pressure against the ends of the folded carton, which by proper creasing is preconditioned to respond by opening into the position shown in Fig. 4.

By observing Fig. 3, it will be noted that when pivot 46 on flywheel 25 starts into its cable pulling half of its cycle of rotation, crankpin 48 will have advanced the shuttle plunger 53 leftwardly to a considerable extent, so that accordingly the severed section of confectionery material will have begun to enter the open carton, requiring only the completion of movement by plunger 53 to the left in order to achieve full placement.

Upon retraction of plunger 53 the loaded carton is free to fall clear when the lip 83 of slide member 76 is sufficiently withdrawn by action of cable 88. Such are the conditions which prevail after plunger 53 has completed its loading stroke leftwardly, as viewed in Fig. 3, and been returned. The retraction of plunger 53 which is effected by its return spring 54 and the permissive action of crankpin 48 takes place rapidly as indicated by the sharp drop-off at its contour 97, a desirable objective in order to permit the strip of confectionery stock to descend into engagement with faceplate 26 as soon as the cutoff knife 42 is retracted. As a consequence of the return stroke of cable 88, which has already been described as withdrawing the two rack bar slide blocks 76, the idler pinions 82 are rotated counter-clockwise as viewed in Figs. 4 and 5, wherefore the uppermost rack bars 79 are thrust forward so that the nose 95 on the U-shaped stripper members 73 wedges itself behind the lowermost folded carton, stripping it off after the matter best indicated in Fig. 5.

From the foregoing description, it will be understood that the several operations which constitute the cutting and packaging functions necessary to fill tubular cartons with frozen comestibles are accomplished by means of simple, directly functioning mechanical elements, activated by a single rotary member which functions both as a power activator and as a timing device. Because of its low cost of manufacture and lightness of weight, a packaging apparatus of this type can be economically installed at multiple distribution stations close to the consumer markets. This makes it practical and feasible to manufacture and ship the frozen commodities in large, less costly and re-usable packages which can be more efficiently refrigerated and delivered to a plurality of outlying stations while at such stations machines of the type just described can accomplish the consumer size packaging operations without requiring the usual or expected magnitude of machinery costs.

Moreover, the operation of these devices may be accomplished with ease and safety so as not to require any measure of skill either in operation or maintenance. Beyond turning on an electric switch for starting motor 23, an attendant is required merely to maintain the supply of folded cartons 58 and to replenish the stock of strip comestible 33 at the rate of depletion.

Having thus fully disclosed our novel cutting and packaging apparatus for strip comestibles, and demonstrated its operation by reference to a specific embodiment thereof, we claim as our invention:

1. In a machine for slicing frozen comestibles, a supporting structure, a panel secured to said supporting structure and disposed at an angle with the horizontal, a supply chute carried perpendicular to said panel for supporting a slab of frozen comestible for gravitational descent, a knife blade movable through a plane parallel to and spaced from said panel for severing bricks from said slab, a slidable plunger nested at the angle of intersection between said supply chute and said panel for advancing severed bricks laterally, an oscillating arm pivoted on said panel and engageable with said plunger, a continuously rotatable wheel, a link pivotally connected at one end with said wheel and at the other end said knife blade, and a crankpin carried by said wheel in the path of said arm for engagement therewith, whereby said wheel alternately effects a cutting stroke of said blade followed by a shifting stroke of said arm and plunger.

2. In a machine for cutting frozen comestibles, a structure affording an angular support, a mount panel secured to said support, a supply chute perpendicular to said mount panel for supporting a length of frozen comestible for gravitational descent, a knife blade movable through a plane parallel to and spaced from said mount panel for severing bricks from said length, a slidable plunger nested at the intersection between said supply chute and said mount panel for advancing severed bricks laterally, an oscillating lever arm pivoted on said panel and engageable with said plunger, a continuously rotatable flywheel, a link connecting said wheel connected with said knife blade, and a crankpin carried by said wheel for actuating said lever arm, whereby said flywheel alternately effects a cutting stroke of said blade followed by a plunger operating stroke of said lever arm.

3. In an automatic ice cream packaging machine, a carton supply apparatus comprising an inclined chute on which is supported an aligned reserve of folded rectangular cartons prescored with fold lines so as to be erected into rectangular tube form, a follower weight for gravitationally urging said reserve of cartons downwardly on said chute toward a carton erecting station, a pair of rack bar members having between them a gear tooth pinion meshing with teeth in each of said rack bar members whereby to impart alternate and opposite motion to said rack members, spring means for urging one of said rack members so that its foremost extremity is interposed in the path of said reserve of folded cartons, apparatus for opposing said spring means whereby to retract said one of said bar members and permit the descent of said cartons, and means including the other of said rack members effective during the retraction of the first rack member for stripping the lowermost one of said reserve of cartons from said chute and for projecting it into said carton erecting station.

4. In an ice cream machine having a reciprocable knife for severing bricks from bulk, a pair of concurrently but oppositely movable spring actuated bars for erecting cartons and alternately promoting gravity feed of the successive folded cartons to be filled, and a plunger for removing the severed bricks to erected cartons, the combination of a cutting, feeding and packaging control and actuating assembly, comprising: a flywheel; a rotary shaft for continuously turning said flywheel; a crankpin on said flywheel; linkage pivoted to said crankpin and connected with said knife whereby said knife performs a severing stroke and a return stroke once each flywheel revolution; a second crankpin on said flywheel; articulated means engageable by said second crankpin for effecting feed and return strokes of said plunger once each flywheel revolution; and a cable, connected at one end with said crankpin and at the other end with one of said bars, playable out by said flywheel once each flywheel revolution to allow erection of a carton by a first bar contemporaneously with the severing stroke of said knife, and pullable in by said flywheel once each revolution thereof to allow stripping of the lowermost folded carton by a second bar to a position whereat said carton may receive the next severed brick delivered by said plunger.

5. A control and actuating assembly for use with an ice cream machine having a knife for cutting bricks from bulk, a pair of concurrently but oppositely movable spring urged bars for erecting cartons and alternately promoting gravity feed of the successive folded cartons to be filled, and a pusher for removing each severed brick from the area of said knife and to an erected carton, comprising: a wheel continuously turnable to provide machine motivation; linkage pivotally associated with said wheel and connected with said knife whereby said knife performs a cutting and a return stroke once each wheel cycle; an articulated link connected with said pusher and controlled by said wheel to effect movement of said pusher toward an erected carton once each wheel revolution; and a cable connected at one end with one of said bars and at the other end with said wheel, playable out by said wheel once each cycle thereof to allow a first bar to effect carton erection contemporaneously with the cutting action of said knife, and pullable in by said wheel once each cycle thereof to allow the second bar to strip a lowermost carton to a position whereat the carton may receive the next cut brick delivered by said pusher.

6. In an ice cream machine, a base positioned at an angle from the horizontal; a first chute for supporting a gravity fed bulk strip substantially at a right angle to said base; a second chute for supporting a supply of prefolded cartons as a stack lying in a plane substantially parallel with said base, said second chute having a lower portion laterally of that of said first chute; a knife pivotally connected with said base, reciprocable in a plane parallel thereto, and arranged to cut bricks from successively lowered bulk strip portions; a pair of concurrently but oppositely movable spring urged bars mounted substantially perpendicular to said second chute, adjacent the discharge end thereof, and arranged alternately to erect cartons and to promote gravity feed of the successive prefolded cartons to be filled; a spring urged plunger for moving each cut brick from the area of said knife to an erected carton; a wheel mounted to said base for rotation parallel therewith; motor means for continuously turning said wheel; a link pivotally associated with said wheel and connected with said knife whereby said knife performs a cutting stroke and a return stroke once each wheel revolution; a second link articulated to said plunger and controlled by said wheel whereby said plunger performs a feed stroke immediately subsequent to the cutting stroke of said knife and a return stroke once each wheel revolution; a spring actuated brake mechanism engageable with the bulk strip and controlled by said knife whereby the bulk strip is gravity fed during the return stroke of said knife; and a cable connected at one end with one of said bars and at the other end with said wheel, playable out by said wheel once each revolution thereof to allow erection of a carton by a first bar contemporaneously with the cutting stroke of said knife, and pullable in by said wheel once each revolution thereof contemporaneously to allow during the return stroke of said knife the second bar to strip a lowermost pre-folded carton from said stack to a position whereat the carton may receive a cut brick delivered by said plunger.

7. In an ice cream machine, a base positioned at an angle from the horizontal; a chute for supporting a gravity fed bulk strip substantially at a right angle to said base; a knife pivotally connected with said base, reciprocable in a plane parallel thereto, and arranged to cut bricks from successively lowermost bulk strip portions; a slidable plunger arranged to move each cut brick from the area of said knife; a wheel mounted to said base for rotation parallel therewith; means for continuously turning said wheel, a link pivotally associated with said wheel and connected with said knife whereby said knife performs a cutting stroke and a return stroke once each wheel revolution; a second link connected with said plunger and controlled by said wheel whereby said plunger performs a brick removing stroke subsequent to the cutting stroke of said knife and a return stroke once each wheel revolution; and a spring actuated brake mechanism engageable with the bulk strip and controlled by said knife whereby the brake mechanism holds the bulk strip during the cutting stroke of said knife and releases said bulk strip for gravity feed during the return stroke of said knife.

References Cited in the file of this patent

UNITED STATES PATENTS

| | | |
|---|---|---|
| 648,241 | Craw | Apr. 24, 1900 |
| 833,786 | Igon | Oct. 23, 1906 |
| 1,311,321 | Crockett | July 29, 1919 |
| 1,482,138 | Moonijian | Jan. 29, 1924 |
| 1,507,259 | Smith | Sept. 2, 1924 |
| 1,798,560 | Saetta | Mar. 31, 1931 |
| 1,909,541 | Johnson | May 16, 1933 |
| 2,155,995 | Robb | Apr. 25, 1939 |
| 2,307,510 | Johnsen | Jan. 5, 1943 |
| 2,521,213 | Gentry | Sept. 5, 1950 |
| 2,639,677 | Anderson | May 26, 1953 |